(12) United States Patent
Kurihara et al.

(10) Patent No.: US 10,658,681 B2
(45) Date of Patent: May 19, 2020

(54) SEPARATOR FOR FUEL CELL AND FUEL CELL STACK

(71) Applicant: TOYOTA JIDOSHA KABUSHIKI KAISHA, Toyota-shi, Aichi-ken (JP)

(72) Inventors: Takuya Kurihara, Miyoshi (JP); Kenji Sato, Kasugai (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 18 days.

(21) Appl. No.: 15/035,002

(22) PCT Filed: Oct. 29, 2014

(86) PCT No.: PCT/JP2014/005466
§ 371 (c)(1),
(2) Date: May 6, 2016

(87) PCT Pub. No.: WO2015/072096
PCT Pub. Date: May 21, 2015

(65) Prior Publication Data
US 2016/0293974 A1  Oct. 6, 2016

(30) Foreign Application Priority Data

Nov. 15, 2013 (JP) ................................. 2013-236544

(51) Int. Cl.
*H01M 8/021* (2016.01)
*H01M 8/0258* (2016.01)
(Continued)

(52) U.S. Cl.
CPC ......... *H01M 8/021* (2013.01); *H01M 8/0213* (2013.01); *H01M 8/0258* (2013.01);
(Continued)

(58) Field of Classification Search
CPC .. H01M 8/1006; H01M 8/0213; H01M 8/021; H01M 8/2483; H01M 8/241;
(Continued)

(56) References Cited

U.S. PATENT DOCUMENTS

2004/0038114 A1* 2/2004 Wariishi ................ H01M 8/025
429/437
2008/0166608 A1 7/2008 Nakaji et al.
(Continued)

FOREIGN PATENT DOCUMENTS

JP 2006269208 A 10/2006
JP 2008-210700 9/2008
(Continued)

*Primary Examiner* — Jonathan G Jelsma
*Assistant Examiner* — Omar M Kekia
(74) *Attorney, Agent, or Firm* — Dickinson Wright, PLLC (57) ABSTRACT

An object is to equalize the level of cooling along a top-bottom direction of a fuel cell stack. A fuel cell stack has an anode-side separator placed between a plurality of membrane electrode assemblies. The anode-side separator comprises a separator center area that is arranged to face a power generation area of the membrane electrode assembly; an outer peripheral portion that is extended from the separator center area to outer periphery and has a plurality of openings for cooling medium supply manifolds; and a rib that is firmed from a beam portion provided to separate the adjacent openings for cooling medium supply manifolds from each other, over an area between the openings for cooling medium supply manifolds and the separator center area.

6 Claims, 4 Drawing Sheets

(51) Int. Cl.
*H01M 8/0267* (2016.01)
*H01M 8/2483* (2016.01)
*H01M 8/0213* (2016.01)
*H01M 8/1006* (2016.01)
*H01M 8/1018* (2016.01)
*H01M 8/241* (2016.01)

(52) U.S. Cl.
CPC ....... *H01M 8/0267* (2013.01); *H01M 8/1006* (2013.01); *H01M 8/1018* (2013.01); *H01M 8/241* (2013.01); *H01M 8/2483* (2016.02); *H01M 2008/1095* (2013.01); *H01M 2300/0082* (2013.01)

(58) Field of Classification Search
CPC . H01M 2008/1095; H01M 2300/0082; H01M 8/2415; H01M 8/0258; H01M 8/0267; H01M 8/1018
USPC .......................................... 429/483
See application file for complete search history.

(56) References Cited

U.S. PATENT DOCUMENTS

| | | | |
|---|---|---|---|
| 2009/0023047 A1* | 1/2009 | Kume | H01M 8/0258 429/434 |
| 2010/0239957 A1 | 9/2010 | Yamamoto et al. | |
| 2011/0207018 A1* | 8/2011 | Nakagawa | H01M 8/0258 429/483 |
| 2014/0134511 A1 | 5/2014 | Okabe | |
| 2014/0141350 A1 | 5/2014 | Hamada | |

FOREIGN PATENT DOCUMENTS

| | | |
|---|---|---|
| JP | 2009-117220 | 5/2009 |
| JP | WO 2013/005300 | 1/2013 |
| WO | WO 2006/101260 A1 | 9/2006 |
| WO | 2013011578 A1 | 1/2013 |

* cited by examiner

SEPARATOR FOR FUEL CELL AND FUEL CELL STACK

TECHNICAL FIELD

The present invention relates to a separator for fuel cell and a fuel cell stack.

BACKGROUND ART

A separator for fuel cell is a component of a fuel cell stack in which a plurality of unit cells are stacked and includes reactive gas flow paths configured to flow a reactive gas in each unit cell and cooling medium flow paths configured to flow a cooling medium in the unit cell. The separator for fuel cell also includes a reactive gas manifold configured to distribute the fluid to the reactive gas flow paths and a cooling medium manifold configured to distribute the cooling medium to the cooling medium flow paths. These manifolds are defined by openings provided in an outer peripheral portion of the separator for fuel cell and are formed as flow paths that pass through in the thickness direction of the separator for fuel cell, i.e., in the stacking direction of the fuel cell stack, when the unit cells and the separators are stacked. The prior art separator for fuel cell has a plurality of openings for cooling medium manifolds as described in, for example, Patent Literature 1. The respective openings for manifolds are aligned in the outer peripheral portion of the separator.

CITATION LIST

Patent Literature

PTL 1: WO 2013/005300

SUMMARY

Technical Problem

In the state that a fuel cell stack including this separator for fuel cell is mounted such that the plurality of cooling medium manifolds are aligned in a vertical direction, the amount of the cooling medium supplied to an upper portion of a center area is likely to be less than the amount of the cooling medium supplied to a lower portion. This results in causing a problem of failing to achieve uniform cooling along a top-bottom direction of the unit cell. With regard to the prior art separator for fuel cell, other needs include easy manufacture and resource saving.

Solution to Problem

In order to solve at least part of the above problems, the invention may be implemented by any of the following aspects.

(1) According to one aspect of the invention, there is provided a separator for fuel cell that is placed between a plurality of membrane electrode assemblies. The separator for fuel cell may comprise a center area; an outer peripheral portion that is an area outside of the center area and has a plurality of openings for manifolds formed therein; and a rib that is formed from a beam portion provided to separate the openings for manifolds from each other, over an area between the openings for manifolds and the center area. When the separator for fuel cell of this aspect is used such that the openings for manifolds are aligned in the vertical direction, the rib is placed between the respective manifolds and is provided over the area between the openings for manifolds and the center area. This configuration suppresses a cooling medium supplied from an upper cooling medium manifold among a plurality of cooling medium manifolds from flowing down in a plane of a unit cell by the gravitational force before the cooling medium reaches a flow path formed in the center area of the separator. The separator for fuel cell of this aspect accordingly suppresses a reduction in amount of the cooling medium supplied to an upper portion of the center area and thereby exerts the advantageous effect of equalizing the level of cooling along the top-bottom direction of the unit cell.

(2) In the separator for fuel cell according to the above aspect, the rib may be inclined in the area between the openings for manifolds and the center area. In a configuration that the rib is inclined upward relative to the horizontal direction, even in the case where the cooling medium flows down by the gravitational force before flowing from an end of the rib to the center area, this configuration enables the cooling medium to be uniformly supplied to the center area. This configuration can thus further equalize the level of cooling along the top-bottom direction of the unit cell.

(3) In the separator for fuel cell according to the above aspect, the manifold may be a cooling medium supply manifold configured to supply a cooling medium to the center area. The separator for fuel cell of this aspect can equalize the flow rate of the cooling medium supplied to the center area.

(4) According to another aspect of the invention, there is provided a fuel cell stack in which a plurality of membrane electrode assemblies are stacked with a separator for fuel cell placed therebetween. In the fuel cell stack of this aspect, the separator for fuel cell may comprise a center area that is arranged to face a power generation area of the membrane electrode assembly; an outer peripheral portion that is an area outside of the center area and has a plurality of openings for manifolds for a cooling medium formed therein; and a rib that is formed from a beam portion provided to separate the openings for manifolds from each other, over an area between the openings for manifolds and the center area. Like the separator for fuel cell of the above aspect, the fuel cell stack of this aspect suppresses a reduction in amount of the cooling medium supplied to an upper portion of a unit cell. Accordingly the fuel cell stack of this aspect has the advantageous effect of equalizing the level of cooling along the top-bottom direction of the unit cell and improving the efficiency of power generation.

(5) In the fuel cell stack of the above aspect, the separator for fuel cell may be provided on an anode side of the membrane electrode assembly. This configuration allows for formation of a cooling medium flow path on the anode side.

The invention may be implemented by any of various aspects, for example, a fuel cell system including the fuel cell stack of the above aspect.

DESCRIPTION OF EMBODIMENT

A. General Configuration

Figure 1:
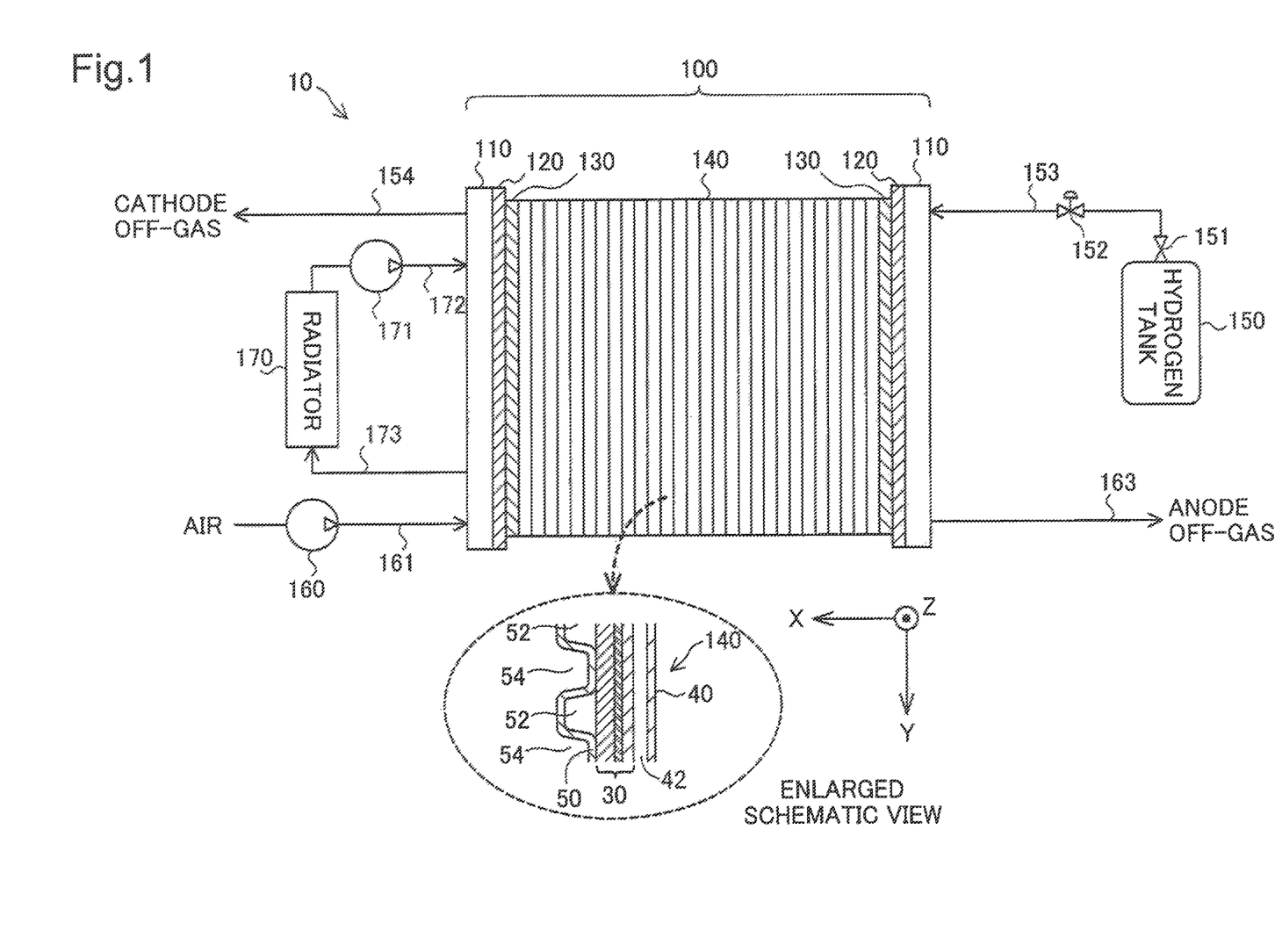
FIG. 1 is a diagram illustrating the schematic configuration of a fuel cell system according to an embodiment of the invention.

FIG. 1 is as diagram illustrating the schematic configuration of a fuel cell system 10 according to an embodiment of the invention. The fuel cell system 10 includes a fuel cell stack 100. The fuel cell stack 100 has a stacked structure in which an end plate 110, an insulator plate 120, a current collector 130, a plurality of unit cells 140, a current collector 130, an insulator plate 120 and an end plate 110 are stacked in this sequence. This fuel cell stack 100 is mounted such that the stacking direction of the unit cells 140 is a horizontal direction X.

Hydrogen as a fuel gas is supplied from a hydrogen tank 150 configured to store high-pressure hydrogen through a shut valve 151, a regulator 152 and a pipe 153 to the fuel cell stack 100. The unused fuel gas (anode off-gas) that is not used in the fuel cell stack 100 is discharged through an exhaust pipe 163 out of the fuel cell stack 100. The fuel cell system 10 may have a recirculation mechanism that is configured to recirculate the anode off-gas to the pipe 153-side. The air as an oxidizing gas is also supplied through an air pump 160 and a pipe 161 to the fuel cell stack 100. The unused oxidizing gas (cathode off-gas) that is not used in the fuel cell stack 100 is discharged through an exhaust pipe 154 out of the fuel cell stack 100. The fuel gas and the oxidizing gas are also called reactive gases.

Additionally, a cooling medium cooled down by a radiator 170 is supplied through a water pump 171 and a pipe 172 to the fuel cell stack 100, with a view to cooling down the fuel cell stack 100. The cooling medium discharged from the fuel cell stack 100 is circulated through a pipe 173 to the radiator 170. The cooling medium used may be, for example, water, an antifreeze such as ethylene glycol, or the air.

As shown by a partially enlarged schematic view of FIG. 1, each of the unit cells 140 included in the fuel cell stack 100 has a structure that a membrane electrode assembly (also called MEA) 30 is placed between a pair of separators or more specifically an anode-side separator 50 and a cathode-side separator 40. The MEA 30 includes an anode and a cathode that are placed on the respective faces of an electrolyte membrane. The anode-side separator 50 has fuel gas flow paths 62 that are formed by a plurality of linear grooves on an MEA 30-side surface and cooling medium flow paths 54 that are formed by a plurality of linear grooves on an opposite surface opposite to the MEA 30. The cathode-side separator 40 has an oxidizing gas flow path 42 formed on an MEA 30-side surface by placing a flow path-forming member for flowing the air. The flow path-forming member is, for example, expanded metal (not shown). The fuel cell stack 100 of the embodiment is a polymer electrode fuel cell stack, and the electrolyte membrane is a proton-conductive ion exchange membrane made of a solid polymer material such as fluororesin.

B. Configuration of Separator

Figure 2:
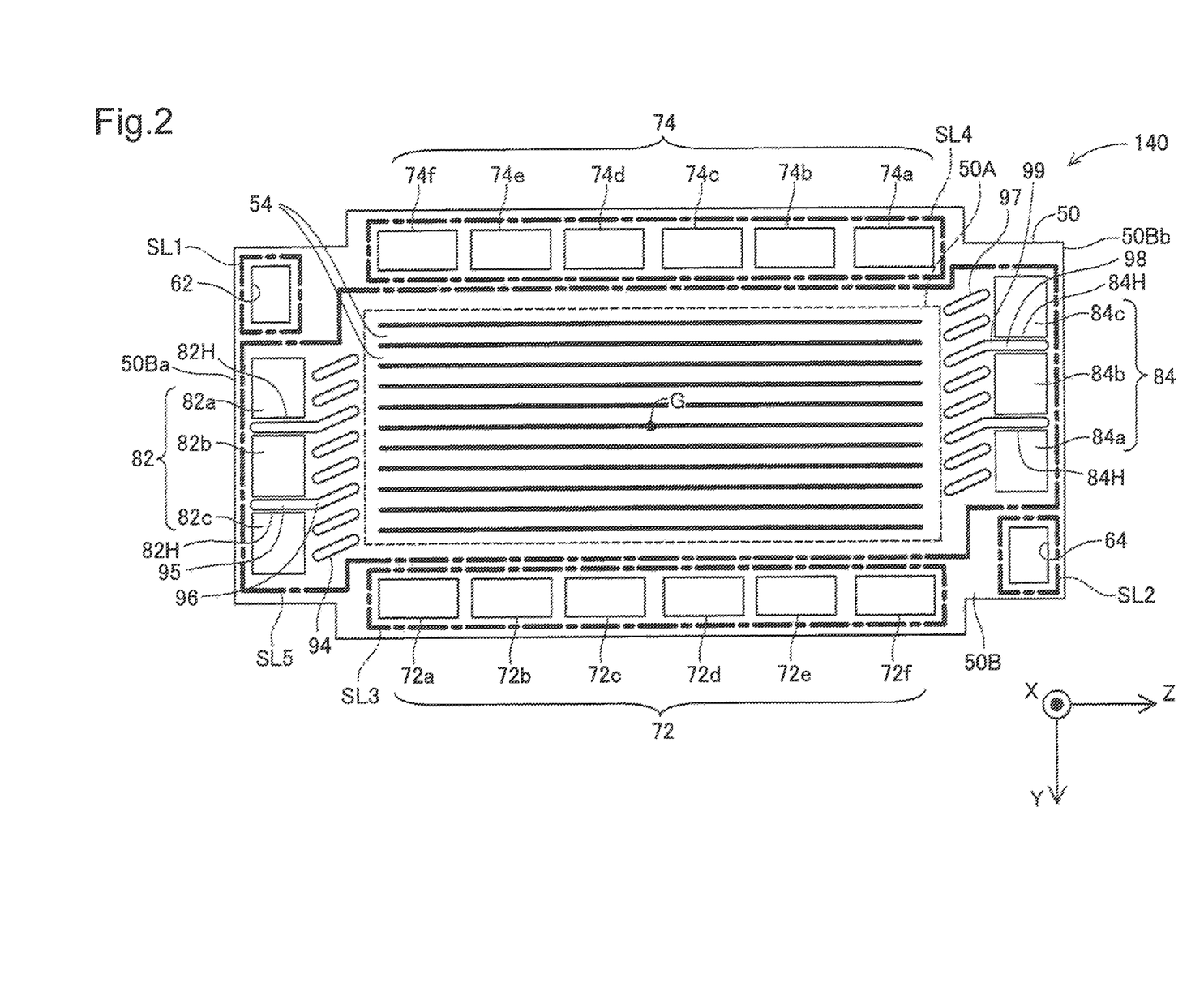
FIG. 2 is a plan view illustrating a stacked unit cell viewed from an anode-side separator.

FIG. 2 is a plan view illustrating the stacked unit cell 140 viewed from the anode-side separator 50 when the fuel cell stack 100 is virtually cut in the middle of the stacking direction. The front-rear direction of FIG. 2 is equal to the stacking direction X, and the top-bottom direction of FIG. 2 is equal to an approximately vertical direction Y of the fuel cell stack 100. The anode-side separator 50 and the cathode-side separator 40 are made of a material having gas impermeability and electron conductivity, for example, a carbon material such as dense carbon obtained by compressing carbon particles to be gas impermeable or a metal material such as press-formed stainless steel or titanium steel. According to this embodiment, the separators 40 and 50 are produced by press-forming stainless steel.

The anode-side separator 50 includes a separator center area 50A that is arranged to face a power generation area of the MEA 30 and a flat plate-like outer peripheral portion 50B that is located on the outer periphery of the separator center area 50A. The "power generation area" denotes an area of the MEA 30 in which electric power is generated, and is an approximately rectangular area of the MEA 30 in which the fuel gas is flowed or more specifically the fuel as flow paths 52 (shown in FIG. 1) are provided in the plan view from the stacking direction X. The separator center area 50A is an area that is overlapped with the power generation area in the plan view from the stacking direction X. The outer peripheral portion 50B is an area located outside of the separator center area 50A and has a size that allows at least a cooling medium supply manifold 32 described later to be formed. According to this embodiment, the outer peripheral portion 50B is extended in four directions, i.e., upward in the vertical direction downward in the vertical direction Y, toward one side in a left-right direction Z perpendicular to the vertical direction Y and the stacking direction X and toward the other side in the left-right direction Z.

The outer peripheral portion 50B has openings provided to form a fuel gas supply manifold 62, an oxidizing gas supply manifold 72, a fuel gas discharge manifold 64, an oxidizing gas discharge manifold 74, a cooling medium supply manifold 82 and a cooling medium discharge manifold 84. These manifolds are formed by stacking the unit cells 140 but are regarded as only openings from the viewpoint of each unit cell 140 alone or the anode-side separator 50 alone. In the description hereof, there is no specific distinction between the stacked state (state functioning as the manifold) and the state as the stand-alone (state regarded as only the opening), and both the states are called manifold. The fuel gas supply manifold 62 is a flow path configured to distribute hydrogen as the fuel gas supplied to the fuel cell stack 100, to the fuel gas flow paths 52 (shown in FIG. 1) of the respective unit cells 140. The oxidizing gas supply manifold 72 is a flow path configured to distribute the air as the oxidizing gas supplied to the fuel cell stack 100, to the oxidizing gas flow paths 42 (shown in FIG. 1) of the respective unit cells 140. The fuel gas discharge manifold 64 is a flow path configured to collect the unused fuel gas that is not used in the fuel gas flow paths 52 and discharge the unused fuel gas to outside of the fuel cell stack 100. The oxidizing gas discharge manifold 74 is a flow path configured to collect the unused oxidizing gas that is not used in the oxidizing gas flow path 42 and discharge the unused oxidizing gas to outside of the fuel cell stack 100. The oxidizing gas supply manifold 72 provided in the outer peripheral portion 50B on the upper side in the Y direction of the separator center area is comprised of six oxidizing gas supply manifolds 72a to 72f. The oxidizing gas discharge manifold 74 is comprised of six oxidizing gas discharge manifolds 74a to 74f. Each of the manifolds 62, 64, 72a to 72f and 74a to 74f has a rectangular opening and forms a reactive gas flow path that is extended in the stacking direction X of the fuel cell stack 100. The oxidizing gas supply manifold 72 and the oxidizing gas discharge manifold 74 are respectively divided into a plurality of manifolds, six manifolds according to this embodiment. This configuration aims to ensure both the wide opening area for the oxidizing gas and the strength.

The cooling medium supply manifold 82 is provided in an outer peripheral portion 50Ba on the left side in the Z direction, and the cooling medium discharge manifold 84 is provided in an outer peripheral portion 50Bh on the right side in the Z direction. The cooling medium supply manifold 82 is configured to distribute the cooling medium to the respective unit cells 140. The cooling medium discharge manifold 84 is configured to collect the cooling medium discharged from the respective unit cells 140 and discharge the collected cooling medium to outside of the fuel cell stack 100. The cooling medium supply manifold 82 is comprised of three cooling medium supply manifolds 82a to 82c. The cooling medium discharge manifold 84 is comprised of three cooling medium discharge manifolds 84a to 84c. Each of the manifolds 82a to 82c and 84a to 84c for the cooling medium has a rectangular opening and forms a flow path that is extended in the stacking direction X of the fuel cell stack 100. The cooling medium supply manifold 82 and the cooling medium discharge manifold 84 are respectively divided into a plurality of manifolds, three manifolds according to this embodiment. This configuration aims to ensure both the wide opening area for the cooling medium and the strength. The number of divisions of each of the cooling medium supply manifold 82 and the cooling medium discharge manifold 84 is not necessarily limited to three but may be any other plural number. Beam portions 82H are provided between the respective cooling medium supply manifolds 82, and beam portions 84H are provided between the respective cooling medium discharge manifolds 84.

The respective manifolds 72, 74, 62, 64, 82a to 82 and 84a to 84c are provided in the outer peripheral portion 50B of the anode-side separator 50 as described above. More specifically, the respective cooling medium supply manifolds 82a to 82c are aligned in the vertical direction Y along one side 50Ba of the outer peripheral portion 50B. The respective cooling medium discharge manifolds 84a to 84c are aligned in the vertical direction Y along one side 50Bb that is opposite to the side 50Ba of the outer peripheral portion 50B of the separator 50. The direction of alignment herein denotes a direction in the fuel cell stack 100 in which the anode-side separator 50 is placed between adjacent MEAs 30 or in other Words the respective unit cells 140 are stacked in the stacking direction X. In the fuel cell stack 100 in which the anode-side separator 50 is placed between adjacent MEAs 30, the respective cooling medium supply manifolds 82a to 82c are aligned and the respective cooling medium discharge manifolds 84a to 84c are aligned along the vertical direction Y. The direction Y in the fuel cell stack 100 is maintained to the vertical direction when the fuel cell stack is mounted in a mounting location. For example, the direction of the fuel cell stack 100 having the stacked structure is maintained when being mounted on a motor vehicle. In the state that the fuel cell stack 100 is mounted on the vehicle, the respective cooling medium supply manifolds 82a to 82c are aligned and the respective cooling medium discharge manifolds 84a to 84c are aligned along the vertical direction Y.

Gaskets are placed in the unit cell 140 to form seal lines SL1 to SL5 that surround the power generation area and the openings of the respective manifolds in the planar direction. The seal lines SL1 to SL5 formed by the gaskets are shown by the thick one-dot chain line in FIG. 2. The gasket is formed by injection molding and has a cross section in a convex shape. In the state that the plurality of unit cells 140 are stacked, the gaskets abut against to be in close contact with the surface of the separator 50 of an adjacent unit cell 140. The seal lines SL1 and SL2 are provided to suppress leakage of the fuel gas. The seal lines SL3 and SL4 are provided to suppress leakage of the oxidizing gas. The seal line SL5 is provided to suppress leakage of the cooling medium.

FIG. 2 is a diagram illustrating the unit cell 140 viewed from the anode-side separator 50-side and shows a surface of the anode-side, separator 50 on which the cooling medium is flowed in the planar direction. As illustrated, the seal line SL5 for the cooling medium includes the separator center area 50A arranged to face the power generation area and the respective manifolds 82a to 82c and 84a to 84c for the cooling medium. In other words, the seal line SL5 for the cooling medium is arranged to pass through outside of the manifolds 82a to 82c and 84a to 84c provided in the outer peripheral portion 50B of the separator 50. The plurality of linear cooling medium flow paths 54 (also shown in FIG. 1) along the planar direction are formed in the separator center area 50A. The cooling medium supplied from the cooling medium supply manifolds 82a to 82c is distributed to the respective cooling medium flow paths 54 in the separator center area 50A, flows through the respective cooling medium flow paths 54 and is collected from the respective cooling medium flow paths 54 to the cooling medium discharge manifolds 84a to 84c to be discharged.

Figure 3:
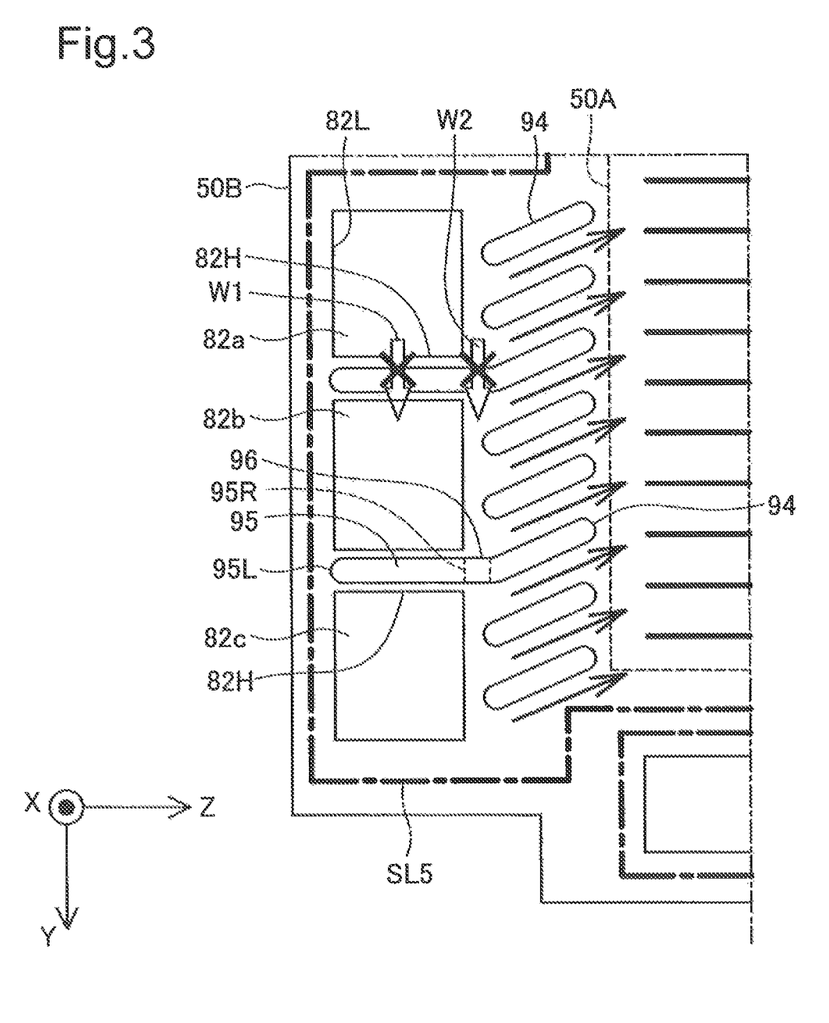
FIG. 3 is a diagram illustrating as plane in the vicinity of cooling medium supply manifolds.

FIG. 3 is a diagram illustrating a plane in the vicinity of the cooling medium supply manifolds 82a to 82c. As illustrated, a plurality of flow control ribs 94 are formed along the vertical direction Y to be placed between the respective cooling medium supply manifolds 82a to 82c and the separator center area 50A. Each of the flow control ribs 94 is protruded in the convex shape from the surface of the anode-side separator 50 and is formed in a shape elongated along a predetermined direction. The flow control ribs 94 are arranged at equal intervals to be parallel to adjacent flow control ribs 94. The predetermined direction herein denotes a direction in which the downstream side of the cooling medium is inclined upward relative to the left-right direction Z. In other words, the flow control ribs 94 are inclined to the Z direction. According to this embodiment, eight flow control ribs 94 are provided for the three cooling medium supply manifolds 82a to 82c. The flow control ribs 94 serve to control the flow direction in order to reduce a variation in flow rate in the vertical direction of the cooling medium supplied to the separator center area 50 and to distribute the supply of the cooling medium in order to prevent localization of the cooling medium.

Reinforcement ribs 95 are provided on the respective beam portions 82H that are arranged to separate the respective cooling medium supply manifolds 82a to 82c. Each of the reinforcement ribs 95 is protruded in the convex shape from the surface of the outer peripheral portion 50B and is formed in a shape elongated along the left-right direction Z to enhance the strength of the beam portion 82H. Left ends 95L of the respective reinforcement ribs 95 are substantially aligned with left edges 82L of the respective cooling medium supply manifolds 82a to 82c in the left-right direction Z. A right end 95R of each reinforcement rib 95 is connected with a specified flow control rib 94 via a connection rib 96 as a connecting portion. The "specified flow control rib" herein denotes one flow control rib nearest to the reinforcement rib 95. The flow control rib 94, the connection rib 96 and the reinforcement rib 95 are formed to have the same height and substantially the same width. Accordingly the reinforcement rib 95, the connection rib 96 and the flow control rib 94 are arranged to form one line rib. The reinforcement rib 95, the connection rib 96 and the flow control rib 94 correspond to the "rib" in the aspects of the invention.

The reinforcement ribs 95, the connection ribs 96 and the flow control ribs 94 shown in FIG. 3 are provided in the vicinity of the cooling medium supply manifolds 82*a* to 82*c*. As shown in FIG. 2, flow control ribs 97, connection ribs 99 and reinforcement ribs 98 of the above configuration are provided in the vicinity of the cooling medium discharge manifolds 84*a* to 84*c*. In the plan view of the anode-side separator 50, the cooling medium supply manifolds 82*a* to 82*c* and the cooling medium discharge manifolds 84*a* to 84*c* are symmetrical about a center G. Additionally, the reinforcement ribs 95, the connection ribs 96 and the flow control ribs 94 and the reinforcement ribs 98, the connection ribs 99 and the flow control ribs 97 are also symmetrical about the center G. The anode-side separator 50 having the above configuration corresponds to the "separator for fuel cell" in the aspects of the invention.

The cathode-side separator 40 also has the respective manifolds 62, 64, 72*a* to 72*f*, 74*a* to 74*f*, 82*a* to 82*c* and 84*a* to 84*c* described above to form part of the respective manifolds for the fuel gas, the oxidizing gas and the cooling medium extended in the stacking direction X of the fuel cell stack 100.

C. Advantageous Effects of Embodiment

In the anode-side separator 50 included in the fuel, cell stack 100 having the above configuration, the flow control ribs 94 serve to equalize the flow of the cooling medium between the respective cooling medium supply manifolds 82*a* to 82*c* and the separator center area 50A. Additionally, the reinforcement ribs 95 are provided between the respective cooling medium supply manifolds 82*a* to 82*c* aligned in the vertical direction and the reinforcement rib 95 is connected with the flow control rib 94 via the connection rib 96. This configuration interferes with the flow of cooling medium W1 (shown by the open arrow in FIG. 3) flowing down from the opening of the upper cooling medium discharge manifold toward the opening of the lower cooling medium discharge manifold of the three cooling medium supply manifolds 82*a* to 82*c*. Formation of the connection ribs 96 or more specifically formation of the ribs extended from the respective beam portions 82H provided to separate the adjacent cooling medium supply manifolds 82*a* to 82*c* across an area between the cooling medium supply manifolds 82*a* to 82*c* and the center area 50A interferes with the downward flow of cooling medium W1 and W2 in this area. In FIG. 3, interfering with the flows of cooling medium W1 and W2 is expressed by x-marks. In a configuration without the connection ribs 96, there is the downward flow of cooling medium W2 between the reinforcement ribs 95 and the flow control ribs 94. The configuration of this embodiment interferes with this downward flow.

Figure 4:
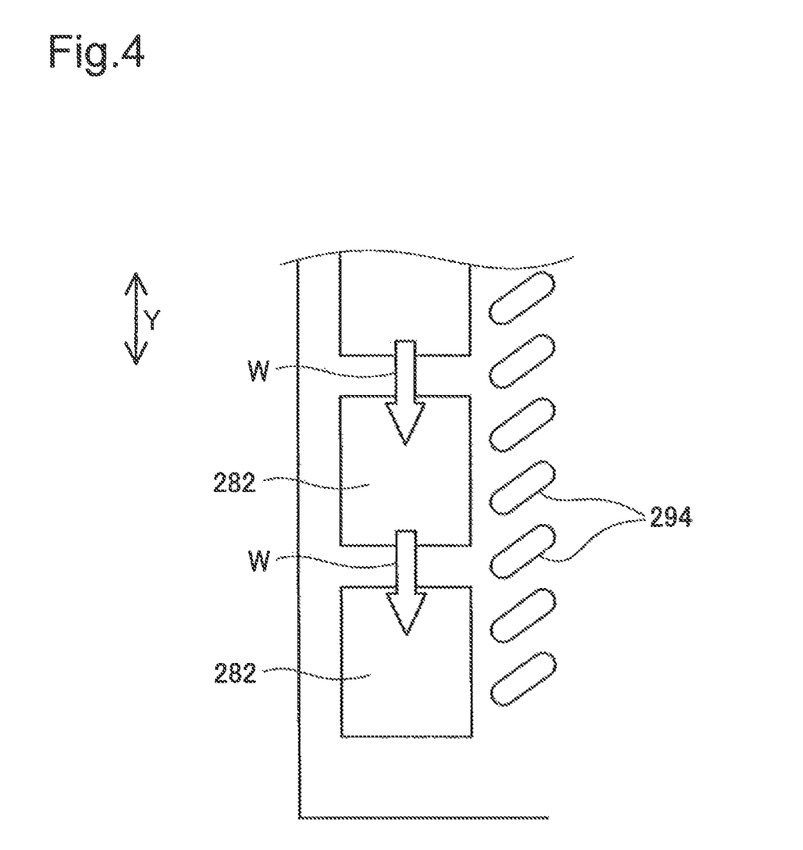
FIG. 4 is a diagram illustrating a plane in the vicinity of cooling medium supply manifolds according to a comparative example.

FIG. 4 is a diagram illustrating a plane in the vicinity of cooling medium supply manifolds according to a comparative example. In this comparative example, a plurality of cooling medium supply manifolds 282 are aligned in the vertical direction Y, and flow control ribs 294 are provided in the vicinity of the cooling medium supply manifolds 282, like the above embodiment. This comparative example differs from the above embodiment by omission of the reinforcement ribs 95 and the connection ribs 96. In the configuration of this comparative example, the cooling medium W flows down from the opening of the upper cooling medium supply manifold 282 toward the opening of the lower cooling medium supply manifold 282 by the gravitational force. In this comparative example, this accordingly reduces the flow rate of the cooling medium flowing from the upper cooling medium supply manifold 282 to the corresponding cooling medium flow paths 54 in the center area 50A. This results in providing a variation in flow rate in the vertical direction Y of the cooling medium that flows through the plurality of cooling medium flow paths 54 aligned in the vertical direction Y in the unit cell 140. More specifically, this decreases the flow rate of the cooling medium flowing through the cooling medium flow paths 54 on the upper side. This fails to achieve uniform cooling in the vertical direction Y in the unit cell 140. The anode-side separator 50 of the embodiment, on the other hand, interferes with the downward flows of cooling medium W1 and W2 as described above and thereby equalizes the flow rate of the cooling medium supplied from the respective cooling medium supply manifolds 82*a* to 82*c* to the plurality of cooling medium flow paths 54 in the separator center area 50A. Accordingly the anode-side separator 50 of the embodiment has the advantageous effect of equalizing the level of cooling along the vertical direction Y in the unit cell 140.

With regard to the cooling medium discharge manifolds 84*a* to 84*c*, the flow control ribs 97, the connection ribs 99 and the reinforcement ribs 98 interfere with the downward flow of cooling medium from the opening of the upper cooling medium supply manifold toward the opening of the lower cooling medium supply manifold. This equalize the flow rate of the cooling medium flowing into the respective cooling medium discharge manifolds 84*a* to 84*c*.

Additionally, according to the embodiment, the flow control ribs 94 provided in the vicinity of the cooling medium supply manifolds 82*a* to 82*c* are inclined relative to the left-right direction such that the downstream side of the cooling medium is inclined upward Even when the flow of cooling medium slightly moves down by the gravitational force in the course from the flow control ribs 94 to the separator center area 50A, this configuration suppresses a variation in supply of the cooling medium to the separator center area 50A.

D. Modifications

Modification 1

According to the above embodiment, the plurality of cooling medium supply manifolds are aligned and the plurality of cooling medium discharge manifolds are aligned in the vertical direction. According to a modification, the direction of alignment may be a direction inclined by a predetermined angle (for example, 5 degrees or 10 degrees) relative to the vertical direction. In general, in the separator for fuel cell of the invention, the "vertical direction" in which the manifolds are aligned includes a direction inclined by a predetermined angle relative to the vertical direction.

Modification 2

According to the above embodiment, the ribs comprised of the reinforcement ribs 95, the connection ribs 96 and the flow control ribs 94 are formed in the shape of the same height and the same width over the entire range. The height and the width of the ribs may, however, not be necessarily fixed over the full length. Especially the connection ribs 96 may not be necessarily formed to have the same height and the same width. The connection ribs may be formed in any shape that sufficiently ensures the flow of the cooling medium by the flow control ribs and interferes with leakage of the cooling medium from between the flow control ribs and the reinforcement ribs.

Modification 3

According to the above embodiment, the reinforcement ribs, the connection ribs and the flow control ribs are provided in combination both in the vicinity of the cooling medium supply manifolds and in the vicinity of the cooling medium discharge manifolds. According to a modification, only the reinforcement ribs may be provided with omission of the connection ribs and the flow control ribs in the vicinity of the cooling medium discharge manifolds, while the ribs of the above combination are provided in the vicinity of the cooling medium supply manifolds.

Modification 4

The "rib" in the aspects of the invention is provided as an integrated form of the reinforcement rib, the connection rib and the flow control rib according to the above embodiment. According to a modification, the rib may be provided as separate ribs. The rib may have be formed in any configuration from the cooling medium discharge manifold over the area between the manifold and the center area. More specifically, the connection ribs may be omitted, and a plurality of ribs may be arrayed from the location where the openings for manifolds are separated from each other, over the area between the manifolds and the center area.

Modification 5

The above embodiment and the respective modifications employ the polymer electrolyte fuel cell for the fuel cell, but the invention is applicable to various other fuel cells such as phosphoric acid fuel cells, molten carbonate fuel cells, and solid oxide fuel cells.

Modification 6

According to the above embodiment, the reinforcement rib 95 is integrally provided via the connection rib 96 with the flow control rib 94 at the position corresponding to the location between the adjacent cooling medium supply manifolds among the flow control ribs 94. According to a modification, a rib provided on the beam portion 82H between the adjacent cooling medium supply manifolds (rib corresponding to the reinforcement rib of the embodiment) may be extended to the area between the center area 50A and the cooling medium supply manifolds. In this modification, the flow control ribs 94 provided in the area between the center area 50A and the cooling medium supply manifolds (short ribs) may be formed independently from the ribs extended from the beam portions between the adjacent cooling medium supply manifolds (long ribs). The short ribs and the long ribs may not necessarily have the same inclinations or the same terminal positions.

The invention is not limited to any of the embodiment and the modifications described above but may be implemented by a diversity of other configurations without departing from the scope of the invention. For example, the technical features of any of the embodiment and modifications corresponding to the technical features of each of the aspects described in Summary may be replaced or combined appropriately, in order to solve part or all of the problems described above or in order to achieve part or all of the advantageous effects described above. Among the components in any of the embodiment and the modifications described above, the components other than those described in independent claims are additional components and may be omitted as appropriate.

INDUSTRIAL APPLICABILITY

The invention relates to the separator for fuel cell and the fuel cell stack and is applicable to the fuel cell, the fuel cell vehicle and manufacture thereof.

REFERENCE SIGNS LIST

10 fuel cell system
40 cathode-side separator
42 oxidizing gas flow path
50 anode-side separator
50A separator center area
50B outer peripheral portion
52 fuel gas flow path
54 cooling medium flow path
62 fuel gas supply manifold
64 fuel gas discharge manifold
72, 72*a*-72*e* oxidizing gas supply manifold
82, 82*a*-82*c* cooling medium supply manifold
84, 84*a*-84*c* cooling medium discharge manifold
82H, 84H beam portion
94 flow control rib
95 reinforcement rib
96 connection rib
97 flow control rib
98 reinforcement rib
99 connection rib
100 fuel cell stack
110 end plate
120 insulator plate
130 current collector
140 unit cell
150 hydrogen tank.
151 shut valve
152 regulator
153 pipe
154 exhaust pipe
160 air pump
161 pipe
163 exhaust pipe
170 radiator
171 water pump
172, 173 pipe
W cooling medium
SL1-SL5 seal line

What is claimed is:

1. A separator for a fuel cell that is used in a fuel cell stack, the separator for the fuel cell comprising:
    a center area;
    an outer peripheral portion that is an area outside of the center area and has a plurality of vertically aligned openings for a manifold formed on a left or right side of the outer peripheral portion;
    a first rib that is formed on a beam portion provided to separate the plurality of vertically aligned openings for supplying a coolant from each other, without surrounding the openings for supplying the coolant, in an area between the openings for supplying the coolant; and a plurality of second ribs that have a terminal end at a position separate from an end of a flow path formed in the center area, and are placed between the plurality of openings for supplying the coolant and the center area, wherein the second ribs are provided to be inclined obliquely upward from the openings for supplying the coolant toward the center area, relative to the horizontal direction, and wherein the first rib that extends toward the center area from the beam portion is connected with at least one nearest second rib.

2. The separator for fuel cell according to claim 1, wherein the second ribs are inclined in an area between the openings and the center area.

3. The separator for fuel cell according to either claim 1 or claim 2, wherein the manifold is an opening provided to form a cooling medium supply manifold that is configured to supply a cooling medium to the center area.

4. The separator for fuel cell according to claim 1, wherein the first rib comprises a first portion formed in the area between the openings, and a second portion that extends from the first portion towards the center area.

5. A fuel cell stack in which a plurality of membrane electrode assemblies are stacked with a separator for a fuel cell placed therebetween, wherein the separator for the fuel cell comprises:

a center area that is arranged to face a power generation area of the membrane electrode assembly;

an outer peripheral portion that is an area outside of the center area and has a plurality of vertically aligned openings for a manifold for a cooling medium formed on a left or right side of the outer peripheral portion;

a first rib that is formed on a beam portion provided to separate the vertically aligned openings for supplying the cooling medium from each other, in an area between the openings, the first rib extends toward the center area from the beam portion, and a plurality of second ribs that have a terminal end at a position separate from an end of a flow path formed in the center area, and are placed between the plurality of openings and the center area, wherein the second ribs are provided to be inclined obliquely upward from the openings for supplying the cooling medium toward the center area, relative to the horizontal direction.

6. The fuel cell stack according to claim 5, wherein the separator for fuel cell is provided on an anode side of the membrane electrode assembly.

* * * * *